United States Patent
Morita (10) Patent No.: US 9,058,553 B2
(45) Date of Patent: Jun. 16, 2015

(54) CONTACT/NON-CONTACT TYPE HYBRID IC CARD, COMMUNICATION METHOD, PROGRAM AND COMMUNICATION SYSTEM

(75) Inventor: Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 772 days.

(21) Appl. No.: 12/477,632

(22) Filed: Jun. 3, 2009

(65) Prior Publication Data

US 2009/0236416 A1 Sep. 24, 2009

(30) Foreign Application Priority Data

Jun. 6, 2008 (JP) ................................. 2008-149825

(51) Int. Cl.
G06K 19/00 (2006.01)
G06K 19/077 (2006.01)
(52) U.S. Cl.
CPC .... G06K 19/07749 (2013.01); G06K 19/07743 (2013.01); G06K 19/07769 (2013.01)
(58) Field of Classification Search
USPC ......... 235/375, 380, 435, 487, 492, 439, 441; 340/10, 572
See application file for complete search history.

(56) References Cited

U.S. PATENT DOCUMENTS

| 5,206,495 | A | * | 4/1993 | Kreft | 235/492 |
|---|---|---|---|---|---|
| 5,929,414 | A | * | 7/1999 | Saitoh | 235/380 |
| 6,003,777 | A | * | 12/1999 | Kowalski | 235/492 |
| 6,045,043 | A | * | 4/2000 | Bashan et al. | 235/441 |
| 6,375,082 | B1 | * | 4/2002 | Kobayashi et al. | 235/492 |
| 6,474,558 | B1 | * | 11/2002 | Reiner | 235/492 |
| 2002/0170974 | A1 | * | 11/2002 | Kashima | 235/492 |
| 2004/0205350 | A1 | * | 10/2004 | Waterhouse et al. | 713/182 |
| 2004/0232248 | A1 | * | 11/2004 | Cho | 235/492 |
| 2005/0045729 | A1 | * | 3/2005 | Yamazaki | 235/492 |
| 2006/0080547 | A1 | * | 4/2006 | Higashiura et al. | 713/186 |
| 2006/0086806 | A1 | * | 4/2006 | Conraux et al. | 235/492 |
| 2010/0060415 | A1 | | 3/2010 | Goyet | |

FOREIGN PATENT DOCUMENTS

| JP | 07-129736 | 5/1995 |
|---|---|---|
| JP | 11-353441 | 12/1999 |
| JP | 2000-184587 | 6/2000 |

(Continued)

OTHER PUBLICATIONS

Japanese Office Action for corresponding JP2008-149825 issued on Apr. 13, 2010.

*Primary Examiner* — Matthew Mikels
(74) *Attorney, Agent, or Firm* — K&L Gates LLP (57) ABSTRACT

A contact/non-contact type hybrid IC card is provided which includes a non-contact interface to communicate in a non-contact manner with a non-contact type reader/writer through an antenna, a contact interface to communicate in a contact manner with a contact type reader/writer through a contact terminal, a storage unit to store personal identification information input from the contact type reader/writer through the contact interface during a contact communication mode by the contact interface, and a control unit to remove a limitation of a prescribed function in a non-contact communication mode by the non-contact interface based on the personal identification information stored in the storage unit during the contact communication mode and switch a communication mode from the contact communication mode to the non-contact communication mode with the limitation of the prescribed function being removed.

12 Claims, 5 Drawing Sheets

(56) References Cited

FOREIGN PATENT DOCUMENTS

| JP | 2000-322544 | 11/2000 |
|---|---|---|
| JP | 2002-024786 | 1/2002 |
| JP | 3528899 | 3/2004 |
| JP | 3838901 | 8/2006 |
| JP | 2009-503665 | 1/2009 |
| WO | 2007-012738 | 2/2007 |

* cited by examiner

CONTACT/NON-CONTACT TYPE HYBRID IC CARD, COMMUNICATION METHOD, PROGRAM AND COMMUNICATION SYSTEM

CROSS REFERENCES TO RELATED APPLICATIONS

The present application claims priority to Japanese Patent Application JP 2008-149825 filed in the Japan Patent Office on Jun. 6, 2008, the entire content of which is hereby incorporated by reference.

BACKGROUND

The present application relates to a contact/non-contact type hybrid IC card, a communication method, a program and a communication system.

Services using a non-contact type IC card with a built-in coil antenna and IC chip are becoming widely available in daily use. The non-contact type IC card is capable of data communication when simply held over a reader/writer of a host device even while remaining inside a wallet, an IC card holder or the like, and thus is highly convenient. Therefore, an IC card system using such a non-contact type IC card is applied to various kinds of services such as an electronic money system, a transportation ticket gate system and a security system for entry and exit or login, for example.

In addition to the non-contact type IC card described above, another type of the IC card is a contact type IC card having a contact terminal. Furthermore, a hybrid IC card which incorporates functions of both the contact type IC card and the non-contact type IC card is being developed in order to reduce the number of IC cards carried by a user. For example, such a hybrid IC card is disclosed in Japanese Unexamined Patent Publication No. 2000-322544, Japanese Patent No. 3838901 and Japanese Patent No. 3528899. The hybrid IC cards have a contact interface and a non-contact interface on one chip and include a switch circuit for switching signals and powers from the respective interfaces therefor.

The hybrid IC card disclosed in Japanese Unexamined Patent Publication No. 2000-322544 usually performs non-contact communication, and upon detecting that a power supply voltage is supplied to a contact terminal, switches a switch circuit to allow contact communication only. On the contrary, the hybrid IC card disclosed in Japanese Patent No. 3838901 switches the contact communication function into the non-contact communication function immediately upon detecting that a sufficient radio frequency (RF) power has been generated by the non-contact interface. Furthermore, the hybrid IC card disclosed in Japanese Patent No. 3528899 implements switching between the contact communication function and the non-contact communication function by incorporating the contact and non-contact interfaces.

As described above, the hybrid IC cards disclosed in Japanese Unexamined Patent Publication No. 2000-322544, Japanese Patent No. 3838901, and Japanese Patent No. 3528899 switch between the contact communication function and the non-contact communication function by detecting the presence or absence of a power supply from the contact terminal, or an electromotive force in the antenna from an external magnetic field, or by further including an external clock signal.

Recently, when using a service function of an IC card, input of personal identification number (PIN) information, biometric information or the like is required in some cases in order to improve the security of the IC card. It is generally the case that a user inputs such personal identification information to an input device which is attached to a non-contact type reader/writer when using the card.

However, it is not assured that the non-contact type reader/writer which includes the input device is a truly reliable device in terms of security. For example, the possibility that a malicious person steals and leaks user's personal identification information which is input to the non-contact type reader/writer is undeniable. Particularly, a user inputs biometric information, which is unchangeable personal information, to an input device installed in a store, ATM or the like in a security system using biometric authentication, and it is not assured that the input device is reliable. If biometric information is input to an unreliable input device and then the information is leaked, this raises the problem of the need to deny the biometric information forever.

SUMMARY

In light of this, if personal identification information can be input to the IC card from a secure device with use of the contact communication function of the hybrid IC card, it is possible to assure the security of the input personal identification information while ensuring the security of the non-contact communication function.

However, the hybrid IC cards disclosed in Japanese Unexamined Patent Publication No. 2000-322544, Japanese Patent No. 3838901 and Japanese Patent No. 3528899 completely switch between the contact communication function and the non-contact communication function regardless of the past processing state of the processor in the card. For example, after the internal state of the IC card is activated via contact communication, the activated state is not maintained but is reset in the subsequent non-contact communication, and non-contact communication is performed by newly setting the state. In this manner, in the hybrid cards according to related art, the contact communication function and the non-contact communication function are independent of each other, and the information obtained by the contact communication function is not held and used for the non-contact communication function. Therefore, it fails to implement a combination of the contact communication function and the non-contact communication function in which a locked service function within the card is unlocked by inputting personal identification information to the card via contact communication and then the service function is used via non-contact communication, for example.

In light of the foregoing, it is desirable to provide a novel and improved contact/non-contact type hybrid IC card, communication method, program and communication system that enable prevention of theft and leakage of personal identification information which is input when using the non-contact communication function.

According to an embodiment, there is provided a contact/non-contact type hybrid IC card which includes a non-contact interface to communicate in a non-contact manner with a non-contact type reader/writer through an antenna, a contact interface to communicate in a contact manner with a contact type reader/writer through a contact terminal, a storage unit to store personal identification information input from the contact type reader/writer through the contact interface during a contact communication mode by the contact interface, and a control unit to remove a limitation of a prescribed function in a non-contact communication mode by the non-contact interface based on the personal identification information stored in the storage unit during the contact communication mode and switch a communication mode from the contact communication mode to the non-contact communication mode with the limitation of the prescribed function being removed.

When a signal is not received in a non-contact manner from the non-contact type reader/writer by the non-contact interface, a frequency that is substantially the same as a frequency of a carrier used in the non-contact communication may be used as a clock frequency for operating the control unit, and when a signal is received in a non-contact manner from the non-contact type reader/writer by the non-contact interface, a frequency of a carrier of the signal may be used as a clock frequency for operating the control unit.

The storage unit may be volatile memory, and the personal identification information stored in the volatile memory may be erased in response to end of the non-contact communication mode.

The contact type reader/writer may be a portable reader/writer attachable to and detachable from the contact/non-contact type hybrid IC card.

The control unit may switch a communication mode from the contact communication mode to the non-contact communication mode according to a mode switch command input from the contact type reader/writer through the contact interface after removing the limitation of the prescribed function in the non-contact communication mode.

The contact terminal may include a reset terminal to receive a reset signal from the contact type reader/writer and a clock terminal to receive a data clock signal from the contact type reader/writer, and the control unit may set a communication mode of the contact/non-contact type hybrid IC card to the contact communication mode upon detection of a change in the reset signal with the data clock signal being detected.

The personal identification information may be PIN information or biometric information input from an input unit placed in the contact type reader/writer.

According to another embodiment, there is provided a communication method by a contact/non-contact type hybrid IC card including a non-contact interface to communicate in a non-contact manner with a non-contact type reader/writer through an antenna and a contact interface to communicate in a contact manner with a contact type reader/writer through a contact terminal, the method including the steps of storing personal identification information input from the contact type reader/writer through the contact interface in a storage unit during a contact communication mode by the contact interface, removing a limitation of a prescribed function in a non-contact communication mode by the non-contact interface based on the personal identification information stored in the storage unit during the contact communication mode, switching a communication mode from the contact communication mode to the non-contact communication mode with the limitation of the prescribed function being removed, and communicating data of the prescribed function in a non-contact manner with the non-contact type reader/writer by the non-contact interface during the non-contact communication mode.

According to another embodiment, there is provided a program for causing a processor of a contact/non-contact type hybrid IC card including a non-contact interface to communicate in a non-contact manner with a non-contact type reader/writer through an antenna and a contact interface to communicate in a contact manner with a contact type reader/writer through a contact terminal to implement a method including the steps of storing personal identification information input from the contact type reader/writer through the contact interface in a storage unit during a contact communication mode by the contact interface, removing a limitation of a prescribed function in a non-contact communication mode by the non-contact interface based on the personal identification information stored in the storage unit during the contact communication mode, switching a communication mode from the contact communication mode to the non-contact communication mode with the limitation of the prescribed function being removed, and communicating data of the prescribed function in a non-contact manner with the non-contact type reader/writer by the non-contact interface during the non-contact communication mode.

According to another embodiment, there is provided a communication system which includes a contact/non-contact type hybrid IC card, a non-contact type reader/writer to communicate in a non-contact manner with the contact/non-contact type hybrid IC card, and a contact type reader/writer to communicate in a contact manner with the contact/non-contact type hybrid IC card, in which the contact type reader/writer includes an input unit to input personal identification information and a transmission unit to transmit the personal identification information in a contact manner to the contact/non-contact type hybrid IC card, and the contact/non-contact type hybrid IC card includes a non-contact interface to communicate in a non-contact manner with the non-contact type reader/writer through an antenna, a contact interface to communicate in a contact manner with the contact type reader/writer through a contact terminal, a storage unit to store the personal identification information input from the contact type reader/writer through the contact interface during a contact communication mode by the contact interface, and a control unit to remove a limitation of a prescribed function in a non-contact communication mode by the non-contact interface based on the personal identification information stored in the storage unit during the contact communication mode and switch a communication mode from the contact communication mode to the non-contact communication mode with the limitation of the prescribed function being removed.

In the above structure, in the contact/non-contact type hybrid IC card, personal identification information input from the contact type reader/writer through the contact interface is stored in a storage unit during the contact communication mode by the contact interface, a limitation of a prescribed function in the non-contact communication mode by the non-contact interface is removed based on the personal identification information stored in the storage unit during the contact communication mode, a communication mode is switched from the contact communication mode to the non-contact communication mode with the limitation of the prescribed function being removed, and data of the prescribed function is communicated in a non-contact manner with the non-contact type reader/writer by the non-contact interface during the non-contact communication mode. It is thereby possible to input personal identification information, which is necessary to be input for removing the limitation of the prescribed function in the non-contact communication mode, not to an unreliable external unit but to the contact type reader/writer that performs contact communication with the hybrid IC card.

According to an embodiment, it is possible to prevent theft and leakage of personal identification information which is input when using the non-contact communication function.

Additional features and advantages are described in, and will be apparent from, the following Detailed Description and the figures.

DETAILED DESCRIPTION

The present application will be described below in greater detail with reference to the drawings according to an embodiment. Note that, in this specification and the appended drawings, structural elements that have substantially the same function and structure are denoted with the same reference numerals, and repeated explanation of these structural elements is omitted.

First Embodiment

Figure 1A:
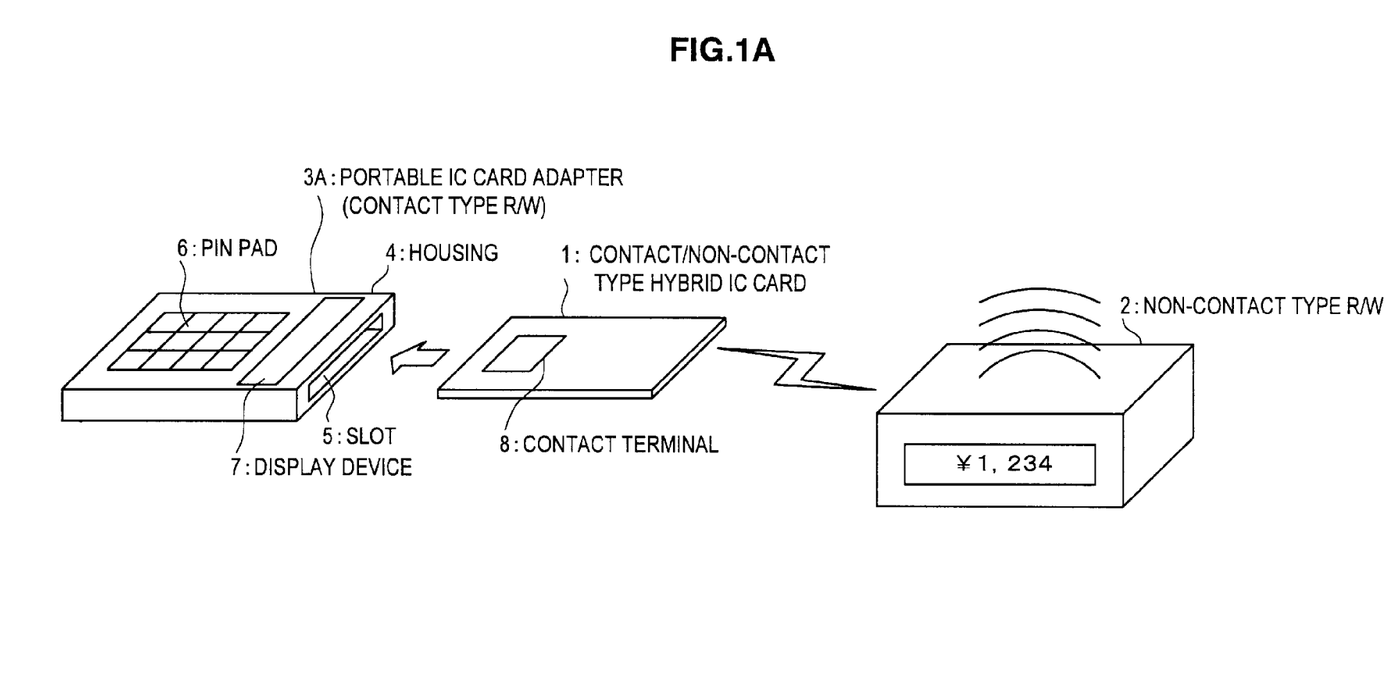
FIG. 1A is a schematic diagram showing the overall structure of a communication system according to a first embodiment.
Figure 1B:
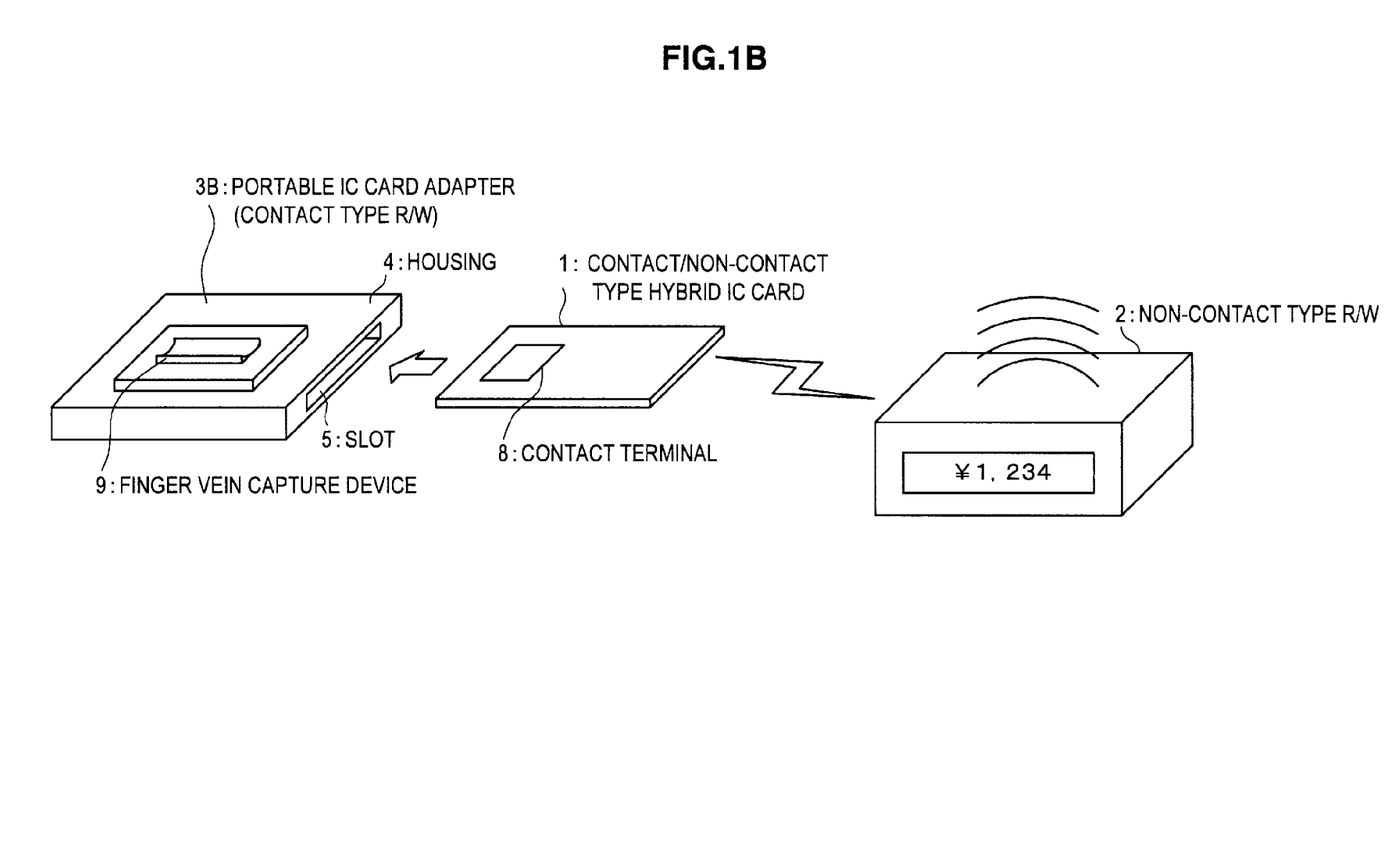
FIG. 1B is a schematic diagram showing an alternative example of the overall structure of a communication system according to the first embodiment.
Figure 2:
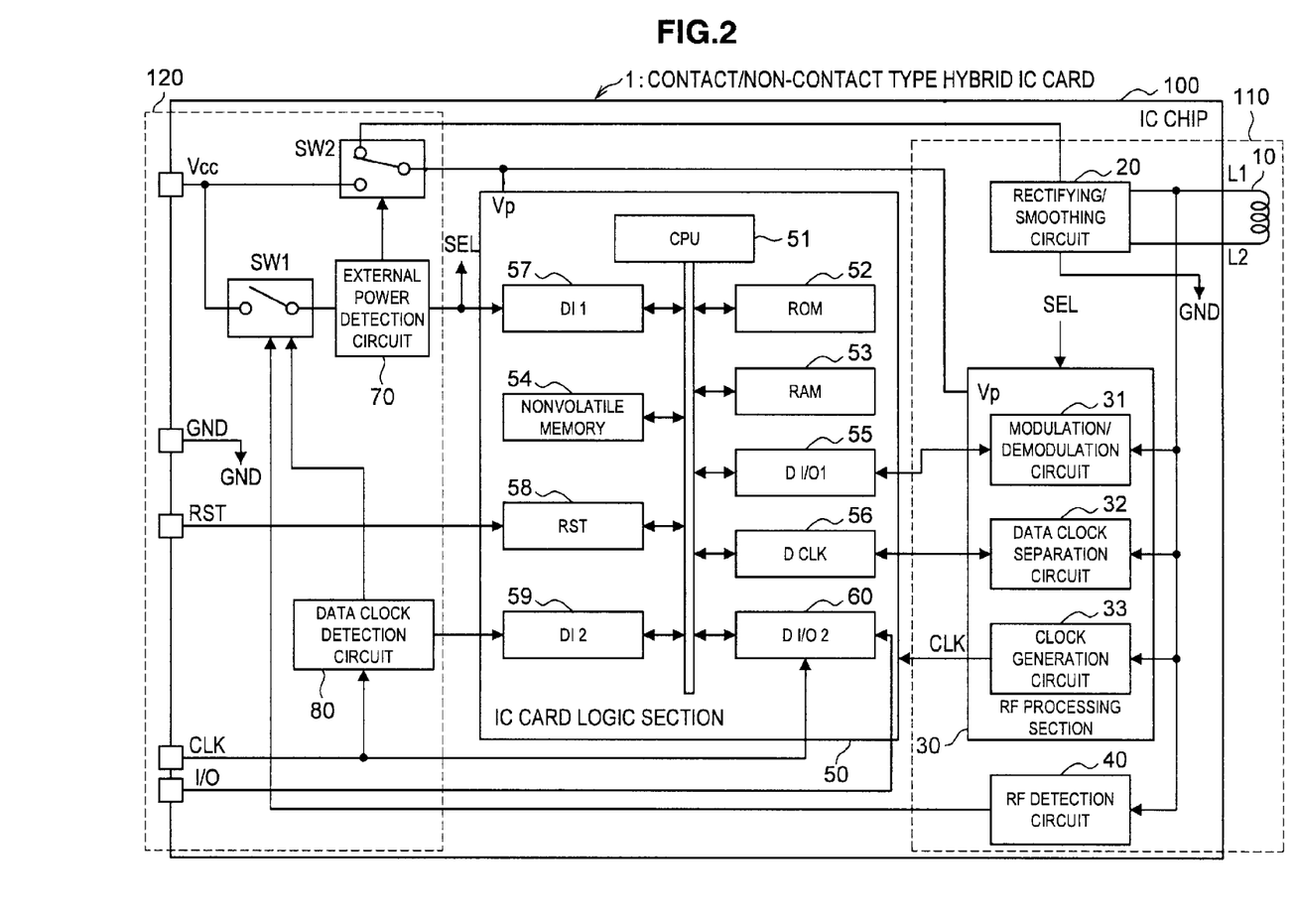
FIG. 2 is a block diagram showing the configuration of a contact/non-contact type hybrid IC card according to the embodiment.
Figure 3:
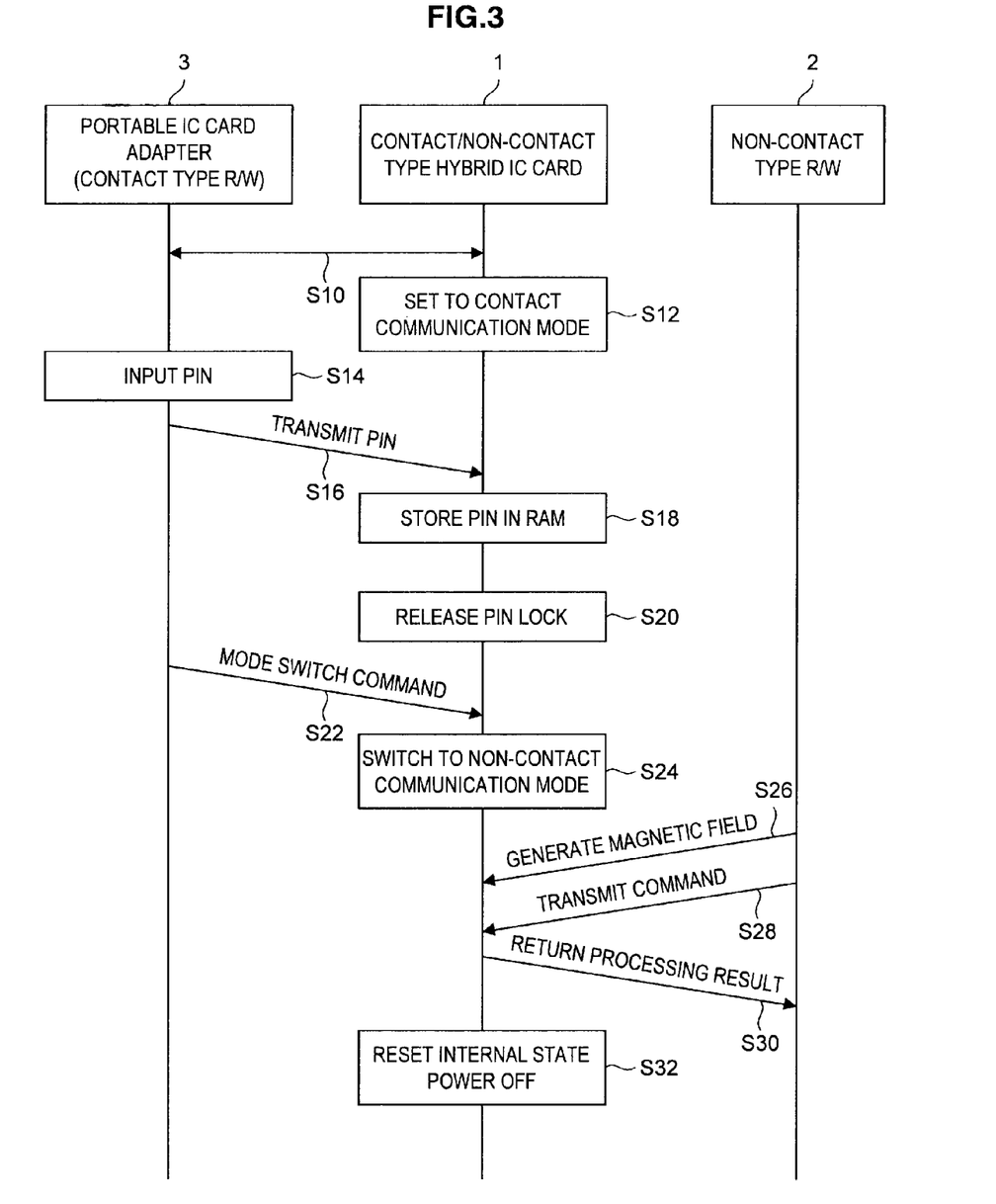
FIG. 3 is a sequence chart showing a communication method in a communication system according to the embodiment.
Figure 4:
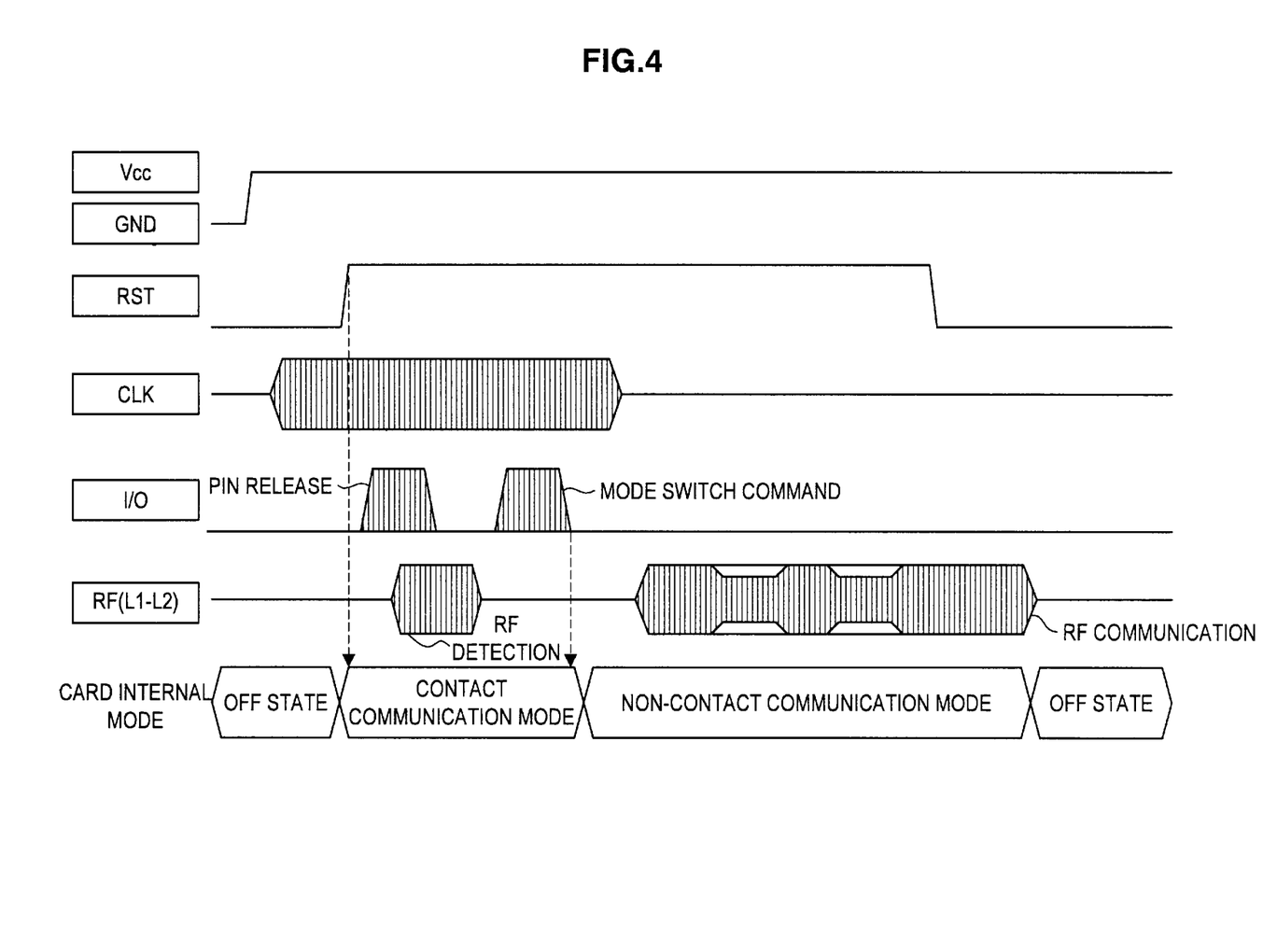
FIG. 4 is a timing chart showing a signal received by a contact/non-contact type hybrid IC card according to the embodiment and communication modes.

A contact/non-contact type hybrid IC card, a communication method, a program and a communication system according to a first embodiment are described hereinafter. The explanation is given in the following order:

1. Overall structure of a communication system: FIG. 1A, FIG. 1B
2. Configuration of a hybrid IC card: FIG. 2
3. Communication method: FIG. 3, FIG. 4
4. Advantage <1. Overall Structure of a Communication System: FIG. 1A, FIG. 1B>

The overall structure of a communication system according to an embodiment is described hereinafter with reference to FIG. 1A and FIG. 1B. FIG. 1A and FIG. 1B are schematic diagrams showing the overall structure of the communication system according to the embodiment. FIG. 1A shows an example of the structure in which an input device of a portable IC card adapter 3A is a PIN pad 6, and FIG. 1B shows an example of the structure in which an input device of a portable IC card adapter 3B is a finger vein capture device 9. Hereinafter, the portable IC card adapters 3A and 3B are referred to collectively as the "portable IC card adapter 3".

Referring to FIG. 1, the communication system according to an embodiment includes a contact/non-contact type hybrid IC card 1 (which corresponds to a contact/non-contact type hybrid IC card according to an embodiment), a non-contact type reader/writer 2 (which corresponds to a non-contact type reader/writer according to an embodiment), and a portable IC card adapter 3 (which corresponds to a contact type reader/writer according to an embodiment).

The contact/non-contact type hybrid IC card 1 (which is referred to hereinafter as the "hybrid IC card 1") is a user-portable card-type IC card, and it is a dual interface IC card capable of communication with an external device both in contact and non-contact manners. The hybrid IC card 1 includes a non-contact interface (not shown) and a contact interface (not shown) in a thin outer package of the card.

The non-contact interface includes an antenna for non-contact communication with the non-contact type reader/writer 2 and an RF processing section for processing communication data (both not shown). The non-contact interface has a function to communicate data in a non-contact manner with the non-contact type reader/writer 2 through the antenna. On the other hand, the contact interface includes a contact terminal 8 for making a physical connection to an output terminal of the contact type reader/writer (portable IC card adapter 3). The contact interface has a function to communicate data in a contact manner with the contact type reader/writer (portable IC card adapter 3) through the contact terminal.

The non-contact type reader/writer 2 is a non-contact type data reading and writing device that communicates data with the hybrid IC card 1 or a general non-contact type IC card in a non-contact manner. The non-contact type reader/writer 2 is mounted internally or externally on a host device (not shown) of an IC card system that provides various kinds of services. The host device may be a user terminal such as a personal computer (PC) or a portable terminal, an automatic ticket gate, an automatic vending machine, a register device in a store or the like, for example.

Non-contact communication between the hybrid IC card 1 and the non-contact type reader/writer 2 may be "symmetric transmission" which is performed at a transmission speed of 212 kbps with use of a 13.56 MHz carrier, without use of a subcarrier, for example. Further, an amplitude shift keying (ASK) modulation may be used as a modulating method, and Manchester encoding may be used as an encoding method.

By such non-contact communication, it is possible to read or write data in the non-contact type IC card simply by holding the non-contact type IC card such as the hybrid IC card 1 over the non-contact type reader/writer 2 and locating the non-contact type IC card within an effective range of an electromagnetic wave emitted from the non-contact type reader/writer 2 (within a communication range of the non-contact type reader/writer 2). Thus, the non-contact type IC card has the convenience that it is easy to use and it is possible to transmit and receive data quickly because there is no need to insert or remove the card to or from the non-contact type reader/writer 2. Further, the non-contact type IC card also has the convenience that it is highly secure because modification or alternation is difficult and it is reusable by rewriting data.

Because of such convenience, the non-contact type IC card is widely applied to IC card systems which provide various kinds of services. For example, the non-contact type IC card is applied to an electronic money system, a transportation ticket gate system, an expressway toll collection system, an electronic settlement system, a security system for entry to a building or a room or login to a PC, and so on. Further, a multi-application type card which incorporates the multiple functions in one non-contact type IC card has been developed, and the non-contact type IC card is becoming diversified.

Generally, the non-contact type IC card does not include a power source such as a battery and operates using a first power (RF power) supplied from the non-contact type reader/writer 2 through the antenna. The RF power is a power that is generated by an induced electromotive force which occurs in the coil antenna of the non-contact type IC card by an electromagnetic wave emitted from the non-contact type reader/writer 2. The use of the RF power eliminates the need to place a battery inside the non-contact type IC card, thus enabling size and cost reduction of the non-contact type IC card.

However, because the RF power obtained in the non-contact type IC card varies depending on a distance between the non-contact type IC card and the non-contact type reader/writer 2, power supply is not stable. For example, if a user holds the non-contact type IC card at the position apart from the non-contact type reader/writer 2, the non-contact type IC card fails to obtain a sufficient RF power and thus fails to perform suitable data communication. Further, because there is a trade-off relationship between the processing speed of a processor included in the IC chip of the non-contact type IC card and the communication available distance of the non-contact type IC card, if the voltage of the obtained RF power is low, the processor is unable to operate at a high speed.

As described earlier, there is another type of the IC card other than the above non-contact type IC card: the contact type IC card having a contact terminal. In order to reduce the number of IC cards carried by a user, a hybrid IC card which incorporates the functions of both the contact type IC card and the non-contact type hybrid IC card is being developed. The IC card which is designed to be a dual-IF IC card by adding the contact interface to the non-contact type IC card is the hybrid IC card 1 according to the embodiment.

The hybrid IC card 1 has the non-contact communication function for the non-contact type reader/writer and the contact communication function for the contact type reader/writer. In the hybrid IC card according to related art, however, the contact communication function and the non-contact communication function are completely switched regardless of the past processing state of the processor in the card, and the two functions are independent of each other, and therefore information and the internal state are not taken over between the two functions. Thus, in the hybrid IC card according to related art, there is no implementation of a combination of the contact communication function and the non-contact communication function in which a locked service function within the card is unlocked by inputting personal identification information to the card via contact communication and then the service function is used via non-contact communication, for example.

In view of the above issue, the portable IC card adapter 3 which is attachable to and detachable from the hybrid IC card 1 is used in the embodiment as shown in FIG. 1. The portable IC card adapter 3 is configured as an external power device having a battery. The portable IC card adapter 3 is attached to the hybrid IC card 1, so that a power is supplied from the portable IC card adapter 3 to the hybrid IC card 1 in a contact manner. It is thereby possible to stably supply an external power (second power) with a higher voltage than the RF power (first power) from the portable IC card adapter 3 to the hybrid IC card 1, thus improving the performance of the hybrid IC card 1.

Further, the portable IC card adapter 3 is configured as a contact type reader/writer capable of contact communication with the hybrid IC card 1 through the contact terminal. Thus, by inputting personal identification information to the portable IC card adapter 3 which is attached to the hybrid IC card 1, it is possible to input the personal identification information safely in a contact manner from the portable IC card adapter 3 to the hybrid IC card 1. The hybrid IC card 1 removes the limitation (function lock) of a prescribed service function to be provided by the non-contact communication function based on the personal identification information input in the contact communication mode and then switches the communication mode from the contact communication mode to the non-contact communication mode, maintaining the unlocked state. The hybrid IC card 1 can thereby use the unlocked service function in the non-contact communication mode. The portable IC card adapter 3 is described hereinafter in detail.

The portable IC card adapter 3 is an example of a contact type reader/writer which is detachably attached to the hybrid IC card 1, and it is a portable reader/writer with a portable size. For better portability, the portable IC card adapter 3 is preferably as thin and small as possible while being attachable to the hybrid IC card 1.

Referring to FIG. 1A and FIG. 1B, the portable IC card adapter 3 includes a box-like housing 4, a slot 5 for attaching the hybrid IC card 1, a battery (not shown) mounted in the housing 4, a feeding terminal and a data input/output terminal (not shown) placed in the slot 5, an input device 6, 9 for a user to input personal identification information, and a display device 7 for displaying data stored in the hybrid IC card 1. The slot 5 corresponds to an attachment unit for attaching the hybrid IC card 1, and the battery corresponds to a power source for supplying the second power to the hybrid IC card 1. Further, the input device 6, 9 corresponds to an input unit for a user to input personal identification information.

The input devices 6 and 9 respectively shown in FIG. 1A and FIG. 1B are described hereinafter. FIG. 1A shows the structure of the portable IC card adapter 3A for inputting personal identification number (PIN) information. As shown in FIG. 1A, the PIN pad 6 is placed on the top face of the portable IC card adapter 3A. The PIN pad 6 is an input device for inputting personal identification number (PIN) information, which is an example of personal identification information. The PIN information is personal identification information (e.g. a password number) used for authentication. The hybrid IC card 1 performs authentication based on the PIN information, and if authentication is succeeded, it locks or unlocks a prescribed service function implemented by non-contact communication of the hybrid IC card 1. On the display device 7 of the portable IC card adapter 3, service data in the attached hybrid IC card 1 (e.g. the balance of an electronic money stored in the hybrid IC card 1 etc.) is displayed, for example.

On the other hand, FIG. 1B shows the structure of the portable IC card adapter 3B for inputting vein information of a user's finger as biometric information. As shown in FIG. 1B, the finger vein capture device 9 is placed on the top face of the portable IC card adapter 3B. The finger vein capture device 9 is an input device for inputting finger vein information, which is an example of personal identification information. The finger vein capture device 9 captures an image of the surface of a user's finger with near-infrared light applied thereto and acquires finger vein information utilizing that the near-infrared light is absorbed by blood flowing through veins. The finger vein information is an example of biometric information used for authentication. The hybrid IC card 1 performs authentication based on biometric information such as the finger vein information, and if authentication is succeeded, it locks or unlocks a prescribed service function implemented by non-contact communication of the hybrid IC card 1. As the biometric information, biological information of an arbitrary part of a human body, such as palm vein or iris, for example, may be used in addition to the finger vein information.

The hybrid IC card 1 is attached to the slot 5 of the portable IC card adapter 3 described above. The hybrid IC card 1 is inserted until the contact terminal 8 of the hybrid IC card 1 is connected to the feeding terminal and the data input/output terminal in the slot 5. For example, it is feasible to insert only a part of the hybrid IC card 1 having the contact terminal 8 into the slot 5 of the portable IC card adapter 3 as shown in FIG. 1, rather than inserting the hybrid IC card 1 entirely into the portable IC card adapter 3. In this case, in the state where the hybrid IC card 1 is attached to the portable IC card adapter 3, the other part of the hybrid IC card 1 is exposed to the outside of the portable IC card adapter 3. An electromagnetic wave emitted from the non-contact type reader/writer 2 is thereby sufficiently received by the antenna in the exposed hybrid IC card 1 without being blocked by the portable IC card adapter 3, thus maintaining stable communication.

The attachment structure that fully inserts the hybrid IC card 1 inside the portable IC card adapter 3 is also feasible. In this case, however, the structure is preferably made in such a way that an electromagnetic wave emitted from the non-contact type reader/writer 2 is not blocked by a metal or the like used for the housing 4 or the like of the portable IC card adapter 3.

By attaching the hybrid IC card 1 to the portable IC card adapter 3 having the above structure, the feeding terminal in the slot 5 and the contact terminal 8 of the hybrid IC card 1 are physically connected. A power of the battery of the portable IC card adapter 3 is thereby supplied to the hybrid IC card 1 through the feeding terminal and the contact terminal 8. The battery may be an arbitrary dry battery, charging battery or the like, for example, and a power supplied from the battery has a higher voltage than the RF power which is acquired by the hybrid IC card 1 from the non-contact type reader/writer 2 through the antenna.

By supplying the external power from the portable IC card adapter 3 to the hybrid IC card 1, it is possible to stably supply a high-voltage power to the IC chip of the hybrid IC card 1. Therefore, by attaching the portable IC card adapter 3 to the hybrid IC card 1, it is possible to improve the performance of the hybrid IC card 1 and enable high-performance non-contact communication with the non-contact type reader/writer 2. For example, it is possible to reduce the non-contact communication time by increasing the processing speed of the processor included in the hybrid IC card 1, enlarge the communication available range by increasing the communication performance of the hybrid IC card 1 and so on. On the other hand, when the portable IC card adapter 3 is not attached to the hybrid IC card 1, the hybrid IC card 1 can normally perform non-contact communication using the RF power from the non-contact type reader/writer 2.

Further, by attaching the hybrid IC card 1 to the portable IC card adapter 3, the data input/output terminal in the slot 5 and a data input/output terminal of the hybrid IC card 1 are physically connected. Personal identification information (e.g. PIN information or biometric information) which is input to the input device 6, 9 of the portable IC card adapter 3 by a user can be thereby transmitted from the portable IC card adapter 3 to the hybrid IC card 1 in a contact manner. Then, the hybrid IC card 1 can perform authentication based on the personal identification information and remove the limitation (lock) of the prescribed service function to be implemented by the non-contact communication function. In addition to the above-described terminals, the portable IC card adapter 3 includes a clock terminal for outputting a clock signal to the hybrid IC card 1, a reset terminal for outputting a reset signal and so on, for example.

Because the portable IC card adapter 3 having the above-described structure is small and inexpensive, a user of the hybrid IC card 1 can individually own and carry it. The portable IC card adapter 3 owned by a user is a contact type reader/writer which is safe and reliable for the user. Therefore, by attaching the own reliable portable IC card adapter 3 to the own non-contact type IC card 1, a user can safely input personal identification information. Although there is a risk of information theft or leakage when inputting personal identification information to the input device of the unreliable non-contact type reader/writer 2 according to related art, there is no such a problem with use of the portable IC card adapter 3 according to the embodiment.

Actual usage of the portable IC card adapter 3 is described hereinafter. For example, in the example of FIG. 1A, when a user intends to use a locked prescribed service function (e.g. an electronic money service, an electronic settlement service etc.) in the hybrid IC card 1, the user first attaches the portable IC card adapter 3A to the hybrid IC card 1. Next, the user inputs PIN information for unlocking the prescribed service function using the PIN pad 6 of the portable IC card adapter 3A. Then, the PIN information is input to the hybrid IC card 1 through the contact terminal from the portable IC card adapter 3A. If authentication is succeeded with the PIN information, the hybrid IC card 1 unlocks the prescribed service function. After that, when the user holds the hybrid IC card 1 over the non-contact type reader/writer 2, data of the prescribed service function is transmitted and received between the non-contact type IC card 1 and the non-contact type reader/writer 2, thereby implementing the service. In this way, the user inputs PIN information to the hybrid IC card 1 using the own portable IC card adapter 3A having the PIN pad 6. This avoids transmission of PIN information to the unreliable non-contact type reader/writer 2, thereby preventing theft and leakage of the PIN information.

Further, in the example of FIG. 1B, for example, when a user intends to use a locked prescribed service function in the hybrid IC card 1 described above, the user first attaches the portable IC card adapter 3B to the hybrid IC card 1. Next, the user places the finger on the finger vein capture device 9 of the portable IC card adapter 3B so as to allow reading of finger vein information for unlocking the prescribed service function. Then, the finger vein information is input to the hybrid IC card 1 through the contact terminal from the portable IC card adapter 3B. If authentication is succeeded with the finger vein information, the hybrid IC card 1 unlocks the prescribed service function. After that, when the user holds the hybrid IC card 1 over the non-contact type reader/writer 2, data of the prescribed service function is transmitted and received between the non-contact type IC card 1 and the non-contact type reader/writer 2, thereby implementing the service. In this way, the user inputs finger vein information to the hybrid IC card 1 using the own portable IC card adapter 3B having the finger vein capture device 9. This avoids transmission of finger vein information to the unreliable non-contact type reader/writer 2, thereby preventing theft and leakage of the finger vein information.

The outline of the operation to switch the communication mode of the hybrid IC card 1 according to the embodiment is described hereinafter. In this embodiment, personal identification information is input from the portable IC card adapter 3 to the hybrid IC card 1 by contact communication, thereby releasing the locked state of a prescribed service function (e.g. an electronic money function) as described above. Then, the hybrid IC card 1 performs non-contact communication with the non-contact type reader/writer 2 while maintaining the state where the lock is removed by contact communication. Thus, if the hybrid IC card 1 according to the embodiment receives a non-contact signal (RF signal) from the non-contact type reader/writer 2 through the antenna when it is operating in the contact communication mode, it switches into the non-contact communication mode and operates in the non-contact communication mode while holding the internal state during the contact communication mode.

In the hybrid IC card according to related art, the contact communication mode and the non-contact communication mode are independent of each other. Therefore, information and the internal state are reset upon mode switching, and the information and the internal state during the contact communication mode are not maintained.

On the other hand, in the hybrid IC card 1 according to the embodiment, the contact communication mode and the non-contact communication mode are correlated with each other, and the information and the internal state which are set during the contact communication mode are held upon mode switching from the contact communication mode to the non-contact communication mode, and a reset operation is not performed. Then, if the hybrid IC card 1 receives an RF signal from the non-contact type reader/writer 2 with the information and the internal state being held, it performs non-contact communication related to the given service according to the instruction of the RF signal without performing the unlock operation of the service function again.

As described above, the communication system according to the embodiment prevents theft and leakage of personal identification information which is input when using the non-contact IC card function while maintaining the security of the service function of the non-contact type IC card 1 with use of the hybrid IC card 1 and the portable IC card adapter 3. The detail is described hereinafter.

<2. Configuration of a Contact/Non-Contact Type Hybrid IC Card: FIG. 2>

The configuration of the hybrid IC card 1 according to the embodiment is described hereinafter with reference to FIG. 2. FIG. 2 is a block diagram showing the configuration of the hybrid IC card 1 according to the embodiment.

Referring to FIG. 2, the hybrid IC card 1 includes an antenna 10 for performing non-contact communication with the non-contact type reader/writer 2 and an IC chip 100 that performs non-contact communication with the non-contact type reader/writer 2 using the antenna 10. The IC chip 100 includes a rectifying/smoothing circuit 20, an RF processing section 30, an RF detection circuit 40, an IC card logic section 50, an external power detection circuit 70, a data clock detection circuit 80, switch circuits SW1 and SW2, and contact terminals (Vcc terminal, GND terminal, RST terminal, CLK terminal, I/O terminal).

The antenna 10, the rectifying/smoothing circuit 20, the RF processing section 30 and the RF detection circuit 40 constitute a non-contact interface 110 for performing non-contact communication with the non-contact type reader/writer 2. On the other hand, the contact terminals (Vcc terminal, GND terminal, RST terminal, CLK terminal, I/O terminal), the external power detection circuit 70, the data clock detection circuit 80 and the switch circuits SW1 and SW2 constitute a contact interface 120 for performing contact communication with the contact type reader/writer (portable IC card adapter 3).

The rectifying/smoothing circuit 20 corresponds to a power generation unit that generates an RF power from a received signal of the antenna 10. The RF processing section 30 and the IC card logic section 50 correspond to a non-contact type IC card function unit that governs the non-contact communication function. The RF detection circuit 40 corresponds to a signal detection unit that detects a received signal from the non-contact type reader/writer 2. The external power detection circuit 70 corresponds to an external power detection unit that detects the presence or absence of supply of the external power from the portable IC card adapter 3. The switch circuits SW1 and SW2 correspond to a power supply switch unit that switches between the RF power and the external power. The Vcc terminal, the GND terminal, the RST terminal, the CLK terminal and the I/O terminal correspond to a contact terminal for performing communication with the contact type reader/writer (portable IC card adapter 3) in a contact manner. A CPU 51 in the IC card logic section 50 corresponds to a control unit, and a RAM 53 corresponds to a storage unit.

As described above, the hybrid IC card 1 is a dual-IF IC card including the non-contact interface 110 and the contact interface 120. The hybrid IC card 1 is capable of non-contact communication with the non-contact type reader/writer 2 by the non-contact interface 110 and also capable of contact communication with the contact type reader/writer (portable IC card adapter 3) by the contact interface 120. The contact terminals (Vcc terminal, GND terminal, RST terminal, CLK terminal and I/O terminal) are contact terminals (which correspond to the contact terminal 8 in FIG. 1) for making a physical connection to the portable IC card adapter 3. The components of the hybrid IC card 1 are described hereinafter.

The antenna 10 is a coil antenna mounted along the outer edge of the hybrid IC card 1, for example. The antenna 10 is connected to the rectifying/smoothing circuit 20, the RF processing section 30 and the RF detection circuit 40.

The rectifying/smoothing circuit 20 includes a rectifying circuit that rectifies a signal received by the antenna 10 and a smoothing circuit that smoothes an output power from the rectifying circuit and generates an RF power to be used in the card 1. The rectifying/smoothing circuit 20 generates a power (RF power) for operating the IC chip 100 from an induced electromotive force which occurs in the antenna 10 by an RF operating magnetic field of a carrier emitted from the non-contact type reader/writer 2.

One end of the antenna 10 is connected to the RF processing section 30 and the RF detection circuit 40. The RF processing section 30 functions as a communication unit for performing non-contact communication between the hybrid IC card 1 and the non-contact type reader/writer 2. The RF processing section 30 processes a signal received from the non-contact type reader/writer 2 through the antenna 10 and a signal to be transmitted to the non-contact type reader/writer 2 through the antenna 10. The RF processing section 30 includes a modulation/demodulation circuit 31, a data clock separation circuit 32 and a clock generation circuit 33.

The modulation/demodulation circuit 31 includes a demodulation circuit that demodulates a signal received from the non-contact type reader/writer 2 through the antenna 10 by a given modulating method (e.g. ASK) and a modulation circuit that modulates data to be transmitted to the non-contact type reader/writer 2 through the antenna 10 by a given modulating method. The demodulation circuit outputs received data obtained by demodulating the signal received by the antenna 10 to a data input/output terminal 55 (D I/O 1) of the IC card logic section 50. The modulation circuit modulates transmission data input from the data input/output terminal 55 and transmits it to the non-contact type reader/writer 2 through the antenna 10.

The data clock separation circuit 32 separates a data clock from a signal received from the non-contact type reader/writer 2 through the antenna 10. The signal is a Manchester encoded signal, for example, and it contains data transmitted from the non-contact type reader/writer 2 and a data clock for extracting the data. The data clock separation circuit 32 outputs the separated data clock to a data clock terminal 56 (D CLK) of the IC card logic section 50.

The clock generation circuit 33 generates a clock for operating the IC card logic section 50 from a signal received from non-contact type reader/writer 2 through the antenna 10. The clock generation circuit 33 divides the frequency of a carrier (e.g. 13.56 MHz) which transmits the signal and generates a clock signal CLK with a prescribed frequency.

The RF detection circuit 40 detects whether a signal with a prescribed voltage or higher is received from non-contact type reader/writer 2 through the antenna 10. For example, the RF detection circuit 40 detects the level of the carrier of the signal received by the antenna 10 and, if it detects the signal voltage of a prescribed level or higher, the RF detection circuit 40 turns on the switch circuit SW1. On the other hand, if the voltage of the signal received by the antenna 10 is lower than a prescribed level, the RF detection circuit 40 keeps the switch circuit SW1 off.

The IC card logic section 50 includes a processor, memory and so on, and it has a function to manage data of a service provided using the IC card 1. The IC card logic section 50 includes a central processing unit (CPU) 51, a read only memory (ROM) 52, a random access memory (RAM) 53, nonvolatile memory 54 and terminals 55 to 60.

The CPU 51 is a processor that operates according to a prescribed program, and it functions as a control unit that controls each component of the IC chip 100 or a processing unit. The CPU 51 executes various kinds of processing according to a program stored in the ROM 52, the nonvolatile memory 54 or the like with use of the RAM 53. The RAM 53 temporarily stores a program to be used by the CPU 51, parameters varying as appropriate during the execution, data to be transmitted to and received from the non-contact type reader/writer 2 and so on. The program to be executed by the CPU 51 is provided to the non-contact type IC card through an arbitrary storage medium or communication medium.

The CPU 51 further functions as a control unit that sets or switches the communication mode of the hybrid IC card 1. There are two communication modes: the non-contact communication mode that communicates with the non-contact type reader/writer 2 in a non-contact manner using the non-contact interface 110, and the contact communication mode that communicates with the contact type reader/writer (portable IC card adapter 3) in a contact manner using the contact interface 120.

When no communication mode is set to the hybrid IC card 1 (when it is in the OFF state), the CPU 51 sets the communication mode of the hybrid IC card 1 to the non-contact communication mode or the contact communication mode. Further, when the contact communication mode is set, the CPU 51 switches the communication mode of the hybrid IC card 1 from the contact communication mode to the non-contact communication mode. When, on the contrary, the non-contact communication mode is set, the CPU 51 switches the communication mode of the hybrid IC card 1 from the non-contact communication mode to the contact communication mode.

Further, the CPU 51 has a function to remove the limitation (lock) of a prescribed service function which is implemented by the non-contact communication during the contact communication mode and a function to switch the communication mode from the contact communication mode to the non-contact communication mode while maintaining the unlocked state. Specifically, the CPU 51 stores personal identification information which is input from the portable IC card adapter 3 into the RAM 53 during the contact communication mode. Then, upon input of a mode switch command from the portable IC card adapter 3, the CPU 51 removes the limitation of the prescribed service function based on the personal identification information stored in the RAM 53. Further, the CPU 51 switches the communication mode from the contact communication mode to the non-contact communication mode with the limitation of the prescribed service function being removed. The switching of the communication mode is described later.

The RAM 53 functions as a storage unit (volatile memory) that stores personal identification information which is input by the portable IC card adapter 3 through the contact interface 120 during the contact communication mode as described above. Because personal identification information such as PIN information and biometric information is personal information of a user, they are preferably erased after unlocking the prescribed service function. The RAM 53 is volatile memory that temporarily stores data, and the stored data is erased when the power is off. Thus, by storing personal identification information in the RAM 53 during the contact communication mode, the personal identification information stored in the RAM 53 is automatically erased upon end of the non-contact communication mode. The personal identification information is thereby not stored in the hybrid IC card 1 for a longer time than necessary, thus preventing skimming and leakage of the personal identification information. Further, an arbitrary volatile memory may be placed in addition to the RAM 53, and personal identification information may be stored in the volatile memory.

A clock frequency for operating the CPU 51 is described hereinafter. When an RF signal from the non-contact type reader/writer 2 is not received by the non-contact interface 110 (e.g. during the contact communication mode), the CPU 51 uses substantially the same frequency as the carrier used for non-contact communication (e.g. the frequency very close to the frequency of the carrier) as a clock frequency. On the other hand, when an RF signal from the non-contact type reader/writer 2 is received by the non-contact interface 110 (e.g. during the non-contact communication mode), the CPU 51 locks to the frequency of the clock signal generated by the clock generation circuit 33 using the frequency of the carrier of the RF signal. Then, it uses the locked frequency as a clock frequency for operating the CPU 51. The clock frequency for operating the CPU 51 is thereby substantially the same between the contact communication mode and the non-contact communication mode so as not to cause a difference in the operation of the CPU 51 between the contact communication mode and the non-contact communication mode. It is thereby possible to appropriately switch the communication mode while holding the internal state of the hybrid IC card 1.

The nonvolatile memory 54 functions as a storage unit that stores various kinds of data, and it is made of a flash memory, for example. The nonvolatile memory 54 stores various kinds of data such as service data to be used for various kinds of services using non-contact communication and management information.

The first data input/output terminal 55 (D I/O 1) receives received data from the modulation/demodulation circuit 31. Further, the first data input/output terminal 55 (D I/O 1) outputs transmission data from the CPU 51 to the modulation/demodulation circuit 31. The data clock terminal 56 (D CLK) receives a data clock from the data clock separation circuit 32. A first data input terminal 57 (DI 1) receives a detection signal SEL from the external power detection circuit 70. A reset terminal 58 (RST) receives a reset signal from the RF detection circuit 40 at the time of signal detection (at the start of non-contact communication) by the RF detection circuit 40. The reset terminal 58 (RST) further receives a reset signal from the RST terminal, which is the contact terminal. A second data input terminal 59 (DI 2) receives a detection signal from the data clock detection circuit 80. A second data input/output terminal 60 (D I/O 2) receives a data clock signal and received data from the portable IC card adapter 3 from the CLK terminal and the I/O terminal, which are the contact terminals. The second data input/output terminal 60 (D I/O 2) also outputs transmission data from the CPU 51 to the portable IC card adapter 3 through the I/O terminal.

The external power detection circuit 70 has a function to detect whether the external power is supplied from the portable IC card adapter 3 through the Vcc terminal. The external power detection circuit 70 checks a voltage applied to the Vcc terminal and if the voltage applied to the Vcc terminal is equal to or higher than a prescribed voltage, it determines that there is supply of the external power. In this case, the external power detection circuit 70 switches the power supply path of the switch circuit SW2 from the rectifying/smoothing circuit 20 side to the Vcc terminal side and outputs a detection signal SEL indicating supply of the external power to the IC card logic section 50 and the RF processing section 30. On the other hand, if the voltage applied to the Vcc terminal is lower than a prescribed voltage, the external power detection circuit 70 determines that there is no supply of the external power, and it keeps the power supply path of the switch circuit SW2 to the rectifying/smoothing circuit 20 side as is already set and does not output the detection signal SEL. The prescribed voltage is a voltage value requested in the CPU 51 and it is 3V, for example.

The switch circuit SW1 is placed on the line connecting the Vcc terminal and the external power detection circuit 70. The switch circuit SW1 is turned on or off based on the instruction from the RF detection circuit 40 to thereby turn on or off the supply of the external power from the Vcc terminal to the external power detection circuit 70. At the time of signal detection by the RF detection circuit 40, the switch circuit SW1 is turned on to supply the external power from the Vcc terminal to the external power detection circuit 70.

The switch circuit SW2 has a function to switch a power to be supplied to the IC card logic section 50 and the RF processing section 30 (non-contact type IC card function unit) selectively to the RF power (first power) or the external power (second power). One side of the switch circuit SW2 is connected to the Vcc terminal and the rectifying/smoothing circuit 20, and the other side is connected to the IC card logic section 50 and the RF processing section 30. The switch circuit SW2 is configured to connect the rectifying/smoothing circuit 20 to the IC card logic section 50 and the RF processing section 30 in the initial state.

The switch circuit SW2 switches the power supply path based on the instruction from the external power detection circuit 70. If the external power is detected by the external power detection circuit 70, the switch circuit SW2 switches the power supply path from the rectifying/smoothing circuit 20 side, which is default setting, to the Vcc terminal side. The external power from the Vcc terminal is thereby supplied to Vp terminals of the IC card logic section 50 and the RF processing section 30 through the switch circuit SW2. On the other hand, if the external power is not detected by the external power detection circuit 70, the switch circuit SW2 does not perform switching of the power supply path and keeps the power supply path to the rectifying/smoothing circuit 20 side, which is default setting. The RF power generated by the rectifying/smoothing circuit 20 is thereby supplied to the Vp terminals of the IC card logic section 50 and the RF processing section 30.

The data clock detection circuit 80 detects whether a data clock signal is input from the portable IC card adapter 3 through the CLK terminal. If the data clock detection circuit 80 detects a data clock signal, it outputs the data clock signal to the data input/output terminal 60 of the IC card logic section 50 and turns on the switch circuit SW1. The external power form the portable IC card adapter 3 is thereby input to the IC card logic section 50 and the RF processing section 30 through the Vcc terminal and the switch circuit SW2 as described above.

An operation of the hybrid IC card 1 having the structure shown in FIG. 2 is described hereinafter.

A non-contact communication operation during the non-contact communication mode is described firstly. When the hybrid IC card 1 is held over the non-contact type reader/writer 2, the antenna 10 of the hybrid IC card 1 receives a signal (electromagnetic wave) transmitted from the non-contact type reader/writer 2. Consequently, an induced electromotive force is generated in the antenna 10 by the magnetic field from the non-contact type reader/writer 2, and an AC signal corresponding to the electromotive force is output to the rectifying/smoothing circuit 20, the modulation/demodulation circuit 31, the data clock separation circuit 32, the clock generation circuit 33 and the RF detection circuit 40.

The rectifying/smoothing circuit 20 receives the electromotive force of the antenna 10 and then rectifies and smoothes the AC signal generated thereby to generate an RF power with a DC voltage, and transmits the RF power as an operating power of the IC chip 100 to the switch circuit SW2.

Further, in response to reception of the signal by the antenna 10, if the RF detection circuit 40 detects a signal voltage of a prescribed level or higher, it turns on the switch circuit SW1 and connects the Vcc terminal and the external power detection circuit 70.

If the switch circuit SW1 is turned on, the external power detection circuit 70 detects whether the voltage level of the external power which is input from the Vcc terminal through the switch circuit SW1 is equal to or higher than a prescribed voltage. If it is equal to or higher than a prescribed voltage, the external power detection circuit 70 transmits the detection signal SEL to the data input terminal 57 of the IC card logic section 50 and the modulation/demodulation circuit 31 of the RF processing section 30. Further, the external power detection circuit 70 operates the switch circuit SW2 to switch the power supply path to the Vcc terminal side so as to supply the external power from the Vcc terminal to the Vp terminals of the IC card logic section 50 and the RF processing section 30. Consequently, the IC card logic section 50 and the RF processing section 30 of the IC chip 100 operate with the high-voltage external power.

On the other hand, in the case where the portable IC card adapter 3 is not attached to the hybrid IC card 1, the voltage at the Vcc terminal is zero. In this case, even if the switch circuit SW1 is turned on by the RF detection circuit 40 and the external power detection circuit 70 and the Vcc terminal are connected, because the voltage at the Vcc terminal is zero, the external power detection circuit 70 does not operate the switch circuit SW2, so that the power supply path remains on the rectifying/smoothing circuit 20 side. Consequently, the RF power from the rectifying/smoothing circuit 20 is supplied to the IC card logic section 50 and the RF processing section 30, and they operate with the low-voltage RF power.

If the external power or the RF power is supplied to the IC chip 100 as described above, the IC card logic section 50 and the RF processing section 30 operate with the power and perform non-contact communication with the non-contact type reader/writer 2 through the antenna 10.

Specifically, when the hybrid IC card 1 receives data from the non-contact type reader/writer 2, the modulation/demodulation circuit 31 of the RF processing section 30 demodulates the signal received by the antenna 10, extracts data and outputs the data to the data input/output terminal 55. Further, the data clock separation circuit 32 separates a data clock contained in the received signal by the antenna 10 and outputs it to the data clock terminal 56. Further, the clock generation circuit 33 generates a clock signal CLK by dividing the frequency of the carrier of the received signal by the antenna 10 and outputs it to the CPU 51.

Further, in the IC card logic section 50, the CPU 51 operates based on the clock signal CLK input from the clock generation circuit 33 and performs various kinds of processing. For example, the CPU 51 extracts the data input from the data input/output terminal 55 at the timing of the data clock input to the data clock terminal 56 and thereby acquires the original data or command transmitted from the non-contact type reader/writer 2. Then, the CPU 51 stores the data into the nonvolatile memory 54, performs prescribed processing based on the command and so on.

On the other hand, when the hybrid IC card 1 transmits data to the non-contact type reader/writer 2, the CPU 51 encodes digital data to be transmitted by Manchester encoding, for example, at the timing of the data clock and outputs the encoded data to the modulation/demodulation circuit 31 through the data input/output terminal 55. When the data is input from the data input/output terminal 55 of the CPU 51, the modulation/demodulation circuit 31 modulates the input data in preference to data extraction from the received signal by the antenna 10, and transmits the modulated signal to the non-contact type reader/writer 2 through the antenna 10.

As described above, the IC chip 100 of the hybrid IC card 1 according to the embodiment operates with the RF power supplied from the antenna 10 or the external power supplied from the Vcc terminal and performs non-contact communication. The IC chip 100 changes the processing speed of the CPU 51 and the modulation factor of the modulation/demodulation circuit 31 depending on whether the power for operating the IC chip 100 is the RF power or the external power.

Specifically, if there is no supply of the external power from the Vcc terminal to the hybrid IC card 1, the IC chip 100 uses the RF power, which is a reproduced power of the magnetic field received by the antenna 10, as a power supply source. On the other hand, if it is detected that the signal with a voltage of a prescribed level or higher is received by the antenna 10 and there is supply of the external power from the Vcc terminal, the IC chip 100 uses the external power from the Vcc terminal as a power supply source. In this manner, if there is power support by the portable IC card adapter 3 when performing non-contact communication with the non-contact type reader/writer 2, the hybrid IC card 1 makes full use of the external power to ensure stable communication.

A contact communication operation during the contact communication mode is described next. In the case where the portable IC card adapter 3 is attached to the hybrid IC card 1, the hybrid IC card 1 is set to the contact communication mode, and it can perform contact communication with the portable IC card adapter 3.

Specifically, when the portable IC card adapter 3 is attached to the hybrid IC card 1, a data clock signal is supplied from the CLK terminal, with the external power being supplied to the Vcc terminal of the hybrid IC card 1. Then, the data clock signal is detected by the data clock detection circuit 80. Based on the detection, the data clock detection circuit 80 turns on the switch circuit SW1. Then, in response thereto, the external power detection circuit 70 detects that the external power from the Vcc terminal is equal to or higher than a prescribed voltage level and operates the switch circuit SW2 to switch the power supply path to the Vcc terminal side. The external power supplied from the portable IC card adapter 3 through the Vcc terminal is thereby supplied to the IC card logic section 50 and the RF processing section 30 through the Vp terminals.

In this state, if a reset signal which is input from the portable IC card adapter 3 through the RST terminal stays LOW for a prescribed period of time and then changes to HIGH, the CPU 51 detects the change in the reset signal based on the input to the reset terminal 58 of the IC card logic section 50. Then, the CPU 51 is reset (initialized) to the initial state. After that, the communication mode of the hybrid IC card 1 is set to the contact communication mode to wait for a signal from the I/O terminal.

Then, the hybrid IC card 1 performs contact communication with the portable IC card adapter 3 through I/O terminal in the contact communication mode. After that, if a particular command (mode switch command) is input from the portable IC card adapter 3, the CPU 51 switches the communication mode of the hybrid IC card 1 from the contact communication mode to the non-contact communication mode. After the mode switching, the non-contact communication in the non-contact communication mode is performed while holding the information and the internal state of the card 1 by contact communication with the portable IC card adapter 3 through the contact terminal during the contact communication mode up to that time.

Specifically, the CPU 51 makes it possible to continue to perform communication in the non-contact mode by setting the state where the data clock signal from the data clock separation circuit 32 of the RF processing section 30 can be communicated through the data clock terminal 56 (D CLK). In this state, the CPU 51 performs prescribed processing in response to a command of non-contact communication from the non-contact type reader/writer 2. At the start of the non-contact communication mode, a reset signal is not transmitted from the RF detection circuit 40 to the reset terminal 58 of the IC card logic section 50, and therefore the CPU 51 is not reset and thus able to execute the non-contact communication mode by taking over the information and the internal state during the past contact communication mode.

<3. Communication Method: FIG. 3, 4>

Referring now to FIG. 3 and FIG. 4, a non-contact communication method in the communication system according to the embodiment is described hereinafter. FIG. 3 is a sequence chart showing a non-contact communication method in the communication system according to the embodiment. FIG. 4 is a timing chart showing a signal received by the non-contact type IC card 1 according to the embodiment and communication modes. The following sequence is based on the assumption that the portable IC card adapter 3 is attached to the hybrid IC card 1 in advance.

Referring to FIG. 3, when the portable IC card adapter 3 (which is referred to hereinafter as the "adapter 3") is attached to the hybrid IC card 1, a prescribed signal is transmitted from the adapter 3 to the hybrid IC card 1 and the external power is supplied (S10). Specifically, the external power from the battery of the adapter 3 is applied to the Vcc terminal of the hybrid IC card 1, and the voltage at the Vcc terminal thereby changes from a ground voltage to a prescribed voltage (e.g. 3V) with which the CPU 51 can operate, as shown in FIG. 4. Further, a data clock signal is input from the adapter 3 to the CLK terminal of the hybrid IC card 1. Then, the data clock signal is detected by the data clock detection circuit 80, the switch circuit SW1 is turned on, and the external power from the Vcc terminal is supplied to the IC card logic section 50 and the RF processing section 30 as described above.

Next, the hybrid IC card 1 is set to the contact communication mode (S12). Specifically, in the state where the external power is supplied from the Vcc terminal and the data clock signal is input from the CLK terminal, a reset signal input from the adapter 3 through the RST terminal stays LOW for a prescribed period of time and then changes to HIGH, as shown in FIG. 4. Then, the CPU 51 detects the change in the reset signal and, at the timing when the reset signal becomes HIGH, the CPU 51 resets (initializes) itself to the initial state and sets the communication mode of the hybrid IC card 1 from the OFF state to the contact communication mode.

Consequently, the hybrid IC card 1 enters the state of waiting for a signal to be input from the adapter 3 through the I/O terminal in the contact communication mode.

After that, if a user inputs PIN information, for example, as personal identification information to the adapter 3 (S14), the adapter 3 transmits the PIN information to the hybrid IC card 1 (S16). The hybrid IC card 1 receives the PIN information from the adapter 3 through the I/O terminal and stores the PIN information into an arbitrary memory, such as the RAM 53 (S18).

Then, the CPU 51 of the non-contact type IC card 1 unlocks a prescribed service function (e.g. an electronic money function) which is restricted for use (locked) among the functions implemented in the non-contact communication mode based on the PIN information stored in the RAM 53 (S20). Specifically, the CPU 51 of the hybrid IC card 1 performs authentication by verifying the PIN information acquired from the adapter 3 against PIN information of a user which is securely prestored in the memory of the card. If, as a result, the both information match and authentication is succeeded, the CPU 51 unlocks the prescribed service function. At this time, the hybrid IC card 1 may transmit information indicating success of authentication to the adapter 3.

Then, in response to detection of the RF signal in the hybrid IC card 1, for example, the adapter 3 transmits a mode switch command to the hybrid IC card 1 (S22). In response to reception of the mode switch command, the hybrid IC card 1 switches the communication mode of the hybrid IC card 1 from the contact communication mode to the non-contact communication mode (S24).

Specifically, a user who intends to perform non-contact communication holds the hybrid IC card 1 with the adapter 3 attached over the non-contact type reader/writer 2. Then, the RF detection circuit 40 of the hybrid IC card 1 detects the RF signal (L1-L2 in FIG. 2) which is received from the non-contact type reader/writer 2 through the antenna 10 as shown in FIG. 4. Then, the hybrid IC card 1 notifies the detection of the RF signal to the adapter 3, and the adapter 3 transmits the mode switch command to the hybrid IC card 1 in response thereto. The mode switch command is input through the I/O terminal of the hybrid IC card 1. Upon reception of the mode switch command from the adapter 3, the CPU 51 of the hybrid IC card 1 switches the communication mode of the hybrid IC card 1 from the contact communication mode with the adapter 3 to the non-contact communication mode with the non-contact type reader/writer 2.

After that, the non-contact type IC card 1 operates in the non-contact communication mode and transmits and receives data to and from the non-contact type reader/writer 2 in a non-contact manner regarding the unlocked prescribed service function (S26 to S30).

Specifically, the non-contact type reader/writer 2 performs polling that emits a polling signal for capturing the hybrid IC card 1 within the communication range, and the magnetic field is thereby generated in the vicinity of the non-contact type reader/writer 2 (S26). If a user holds the hybrid IC card 1 over the non-contact type reader/writer 2, the hybrid IC card 1 is located within the communication range of the non-contact type reader/writer 2 and performs non-contact communication with the non-contact type reader/writer 2. In the non-contact communication, the non-contact type reader/writer 2 transmits a prescribed command to the hybrid IC card 1 (S28), and the hybrid IC card 1 performs prescribed processing according to the command and transmits a processing result back to the non-contact type reader/writer 2 (S30). Transmission and reception of the command and the processing result are repeated a plurality of times according to need.

After that, when the non-contact communication with the non-contact type reader/writer 2 is finished, the hybrid IC card 1 resets the internal state of the CPU 51, locks the prescribed service function, and ends the non-contact communication mode to be turned off (S32).

Specifically, if non-contact communication related to the prescribed service function is finished or a user takes the non-contact type IC card 1 away from the non-contact type reader/writer 2 during non-contact communication, the CPU 51 ends the non-contact communication mode and enters the OFF state. At this time, the CPU 51 of the non-contact type IC card 1 locks the unlocked prescribed service function again and erases the personal identification information stored in the RAM 53. By locking the hybrid IC card 1 again to make it safe after the non-contact communication related to the prescribed service is finished, it is possible to prevent unauthorized use of the hybrid IC card 1. Further, by erasing the personal identification information stored in the hybrid IC card 1, it is possible to prevent skimming of the personal identification information.

Furthermore, the hybrid IC card 1 turns off the switch circuit SW1 and switches the power supply path from the external power path to the RF power path by the switch circuit SW2. Power supply from the portable IC card adapter 3 to the hybrid IC card 1 is thereby blocked to prevent a waste of the battery. Even if the portable IC card adapter 3 is detached from the hybrid IC card 1 after that, the hybrid IC card 1 can normally perform non-contact communication with the non-contact type reader/writer 2 using the RF power supplied from the antenna 10, except for the locked service function.

<4. Advantage>

The communication system composed of the hybrid IC card 1, the non-contact type reader/writer 2 and the portable IC card adapter 3 according to the embodiment and the communication method using the same are described in the foregoing. According to this embodiment, in the dual-IF hybrid IC card 1 incorporating both the contact communication function and the non-contact communication function, the contact communication function of the hybrid IC card 1 is activated by contact communication with the adapter 3, and then non-contact communication with the non-contact type reader/writer 2 is performed while maintaining the activated state.

Therefore, the hybrid IC card 1 is set to the contact communication exclusive mode when it detects that a reset signal becomes HIGH after staying LOW for a certain period of time in the state where a data clock signal is detected from the adapter 3 by contact communication with the adapter 3. Then, personal identification information (PIN information, biometric information) which is input to the adapter 3 is transmitted via contact to the hybrid IC card 1, and the non-contact type IC card 1 unlocks the prescribed non-contact communication function using the personal identification information. After that, if the adapter 3 gives a mode switch command to the hybrid IC card 1 so as to switch to the non-contact communication mode, the hybrid IC card 1 enters the non-contact communication mode while holding the internal state set by the contact communication up to that time and performs non-contact communication with the non-contact type reader/writer 2.

As described above, when unlocking the locked service function in the hybrid IC card 1, the portable adapter 3 owned by a user is attached to the hybrid IC card 1, and PIN information is input to the adapter 3 and then transferred from the adapter 3 to the hybrid IC card 1, thereby releasing the locked state. This avoids inputting PIN information to an unreliable reader/writer, which has been necessary in a system according to related art where PIN information is input to an input device of a non-contact type reader/writer to thereby release the locked state. It is thereby possible to prevent theft and leakage of PIN information to improve the security of the hybrid IC card 1.

Likewise, in the case of improving security by a combination of the hybrid IC card 1 and biometric information, it is also possible to prevent theft and leakage of biometric information. In this case, biometric information is input to the hybrid IC card 1 from the adapter 3 by contact communication, the information is checked for authentication in the hybrid IC card 1, and the lock of the non-contact service function in the hybrid IC card 1 is temporarily removed. This allows a user to avoid inputting own biometric information to an unreliable non-contact type reader/writer.

Further, during the contact communication mode when the RF signal is not received, the non-contact type IC card 1 according to the embodiment uses a frequency that is very close to the frequency of the carrier used in non-contact communication as an operating clock of the CPU 51. On the other hand, during the non-contact communication mode when the RF signal is received, the non-contact type IC card 1 locks to the frequency and uses it as an operating clock of the CPU 51. There is thus no difference in the operation of the CPU 51 between the contact communication mode and the non-contact communication mode, which enables smooth execution of mode switching.

Further, according to the embodiment, a power of the battery of the adapter 3 which is attachable to and detachable from the hybrid IC card 1 is supplied to the hybrid IC card 1 through the contact terminal 8 (Vcc terminal). This enables stable supply of the high-voltage external power to the IC chip of the hybrid IC card 1. Therefore, it is possible to improve the performance of the hybrid IC card 1 so as to perform stable non-contact communication with the non-contact type reader/writer 2 simply by attaching the adapter 3 to the hybrid IC card 1.

Further, the portable IC card adapter 3 enables secure provision of personal identification information to the hybrid IC card 1 and stable supply of a high-voltage power to the hybrid IC card 1 as described above. Therefore, simply by attaching the portable IC card adapter 3 to the hybrid IC card 1, a user can safely input personal identification information and unlock a desired non-contact service function without worrying about theft or leakage of the personal identification information. Further, a user can conveniently use the hybrid IC card 1 by holding it over the non-contact type reader/writer 2 without worrying about shortage of power supply.

As described in the foregoing, because the portable IC card adapter 3 is portable, easy to use, and highly reliable in terms of security, it is convenient for a user who uses the hybrid IC card 1. When a user intends to use a regular non-locked function of the hybrid IC card 1, the user can use the hybrid IC card 1 in a simple normal form without attaching the portable IC card adapter 3. On the other hand, when a user intends to use a locked function of the hybrid IC card 1, the user attaches the portable IC card adapter 3 and inputs personal identification information with ease, thereby enabling convenient use while maintaining security.

The present application contains subject matter related to that disclosed in Japanese Priority Patent Application JP 2008-149825 filed in the Japan Patent Office on Jun. 6, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, the portable IC card adapter 3, which is a contact type reader/writer according to the embodiment, has an attachment structure that allows insertion of a single hybrid IC card 1. However, the present application is not limited thereto, and the contact type reader/writer may allow insertion of a plurality of hybrid IC cards 1. Further, the direction, position or width of attaching the hybrid IC card 1 to the contact type reader/writer, the shape of the contact type reader/writer or the like is not limited to the example shown in FIG. 1, and design may be changed into an arbitrary form.

Further, personal identification information is not limited to PIN information or biometric information, and any personal identification information may be used as long as it is possible to identify a valid user of the hybrid IC card 1.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A contact/non-contact type hybrid IC card comprising:
    a processor;
    a non-contact interface configured to communicate in a non-contact communication mode with a non-contact type reader/writer through an antenna, wherein a prescribed function is restricted for use in the non-contact communication mode unless a limitation of the prescribed function is removed;
    a contact interface configured to communicate in a contact communication mode with a contact type reader/writer through a contact terminal, wherein a personal identification information is configured to be inputted to the contact type reader/writer, and then the personal identification information is configured to be transmitted to the hybrid IC card in a contact manner; and
    a storage unit storing instructions which when executed by the processor, cause the processor to:
    (a) receive the personal identification information from the contact type reader/writer during the contact communication mode;
    (b) remove the limitation of the prescribed function in the non-contact communication mode based on the personal identification information received from the contact type reader/writer to the IC card;
    (c) switch from the contact communication mode to the non-contact communication mode; and
    (d) communicate data of the prescribed function with the non-contact type reader/writer during the non-contact communication mode.

2. The contact/non-contact type hybrid IC card of claim 1, wherein:
    (a) when a signal is not received in a non-contact manner from the non-contact type reader/writer by the non-contact interface, a frequency that is substantially the same as a frequency of a carrier used in the non-contact communication is used as a clock frequency for operation; and
    (b) when a signal is received in a non-contact manner from the non-contact type reader/writer by the non-contact interface, a frequency of a carrier of the signal is used as a clock frequency for operation.

3. The contact/non-contact type hybrid IC card of claim 1, wherein:
    (a) the storage unit includes volatile memory which stores the personal identification information; and
    (b) the personal identification information is erased in response to an end of the non-contact communication mode.

4. The contact/non-contact type hybrid IC card of claim 1, wherein the contact type reader/writer is a portable reader/writer attachable to and detachable from the contact/non-contact type hybrid IC card.

5. The contact/non-contact type hybrid IC card of claim 1, wherein the instructions, when executed by the processor, cause the processor to, after removing the limitation of the prescribed function, during the contact communication mode using the contact interface, using a mode switch command, switch from the contact communication mode to the non-contact communication mode, the mode switch command being input from the contact type reader/writer through the contact interface.

6. The contact/non-contact type hybrid IC card of claim 1, wherein:
   (a) the contact terminal includes:
      (i) a reset terminal to receive a reset signal from the contact type reader/writer; and
      (ii) a clock terminal to receive a data clock signal from the contact type reader/writer; and
   (b) the instructions, when executed by the processor, cause the processor to set the contact/non-contact type hybrid IC card to the contact communication mode upon detection of a change in the reset signal with the data clock signal being detected.

7. The contact/non-contact type hybrid IC card of claim 1, wherein the personal identification information is PIN information or biometric information input from an input unit placed in the contact type reader/writer.

8. A method of operating a contact/non-contact type hybrid IC card including: (a) a non-contact interface configured to communicate in a non-contact communication mode with a non-contact type reader/writer through an antenna, wherein a prescribed function is restricted for use in the non-contact communication mode unless a limitation of the prescribed function is removed; and (b) a contact interface configured to communicate in a contact communication mode with a contact type reader/writer through a contact terminal, wherein a personal identification information is configured to be inputted to the contact type reader/writer, and then the personal identification information is configured to be transmitted to the hybrid IC card in a contact manner, the method comprising:
   (a) receiving the personal identification information from the contact type reader/writer during the contact communication mode;
   (b) removing the limitation of the prescribed function in the non-contact communication mode based on the personal identification information received from the contact type reader/writer to the IC card;
   (c) switching from the contact communication mode to the non-contact communication mode; and
   (d) communicating data of the prescribed function with the non-contact type reader/writer during the non-contact communication mode.

9. A computer-readable medium storing instructions structured to cause a processor of a contact/non-contact type hybrid IC card including: (a) a non-contact interface configured to communicate in a non-contact communication mode with a non-contact type reader/writer through an antenna, wherein a prescribed function is restricted for use in the non-contact communication mode unless a limitation of the prescribed function is removed; and (b) a contact interface configured to communicate in a contact communication mode with a contact type reader/writer through a contact terminal, wherein a personal identification information is configured to be inputted to the contact type reader/writer, and then the personal identification information is configured to be transmitted to the hybrid IC card in a contact manner, to:
   (a) receive the personal identification information from the contact type reader/writer during the contact communication mode;
   (b) remove the limitation of the prescribed function in the non-contact communication mode based on the personal identification information received from the contact type reader/writer to the IC card;
   (c) switch from the contact communication mode to the non-contact communication mode; and
   (d) communicate data of the prescribed function with the non-contact type reader/writer during the non-contact communication mode.

10. A communication system comprising:
   a contact/non-contact type hybrid IC card;
   a non-contact type reader/writer configured to communicate in a non-contact communication mode with the contact/non-contact type hybrid IC card; and
   a contact type reader/writer configured to communicate in a contact communication mode with the contact/non-contact type hybrid IC card, wherein:
   (a) the contact type reader/writer includes:
      (i) an input unit configured to enable personal identification information to be input by a user; and
      (ii) a transmission unit configured to transmit the personal identification information in the contact communication mode to the contact/non-contact type hybrid IC card in a contact manner; and
   (b) the contact/non-contact type hybrid IC card includes:
      (i) a processor;
      (ii) a non-contact interface configured to communicate in the non-contact communication mode with the non-contact type reader/writer through an antenna, wherein a prescribed function is restricted for use in the non-contact communication mode unless a limitation of the prescribed function is removed;
      (iii) a contact interface configured to communicate in a contact communication mode with the contact type reader/writer through a contact terminal;
      (iv) a storage unit storing instructions which when executed by the processor, cause the processor to:
         (A) receive the personal identification information from the contact type reader/writer during the contact communication mode;
         (B) remove the limitation of the prescribed function in the non-contact communication mode based on the personal identification information received from the contact type reader/writer to the IC card;
         (C) switch from the contact communication mode to the non-contact communication mode; and
         (D) communicate data of the prescribed function with the non-contact type reader/writer during the non-contact communication mode.

11. The contact/non-contact type hybrid IC card of claim 1, wherein:
   the prescribed function is an electronic money function.

12. The contact/non-contact type hybrid IC card of claim 1, wherein:
   a state of the prescribed function is set during the contact communication mode and held upon switching from the contact communication mode to the non-contact communication mode.

* * * * *